UNITED STATES PATENT OFFICE.

GEORGE D. VAN ARSDALE, OF EAST ORANGE, NEW JERSEY.

PROCESS OF PRECIPITATING COPPER FROM SOLUTION.

1,147,466.  Specification of Letters Patent.  Patented July 20, 1915.

No Drawing.   Application filed December 26, 1907.   Serial No. 408,127.

*To all whom it may concern:*

Be it known that I, GEORGE D. VAN ARSDALE, a citizen of the United States of America, and a resident of East Orange, county of Essex, and State of New Jersey, have invented certain new and useful Improvements in Processes of Precipitating Copper from Solution, of which the following is a specification.

My invention relates to the separation of copper from ore by the wet process, the distinguishing feature of which is the utilization of sulfur dioxid as a precipitant of the copper from a solution of copper sulfate, and for an example of such a process I refer to Letters Patent of the United States #723,949, issued to me on the 31st day of March, 1903.

The copper ore to be treated is first reduced to a crushed or comminuted state, and the copper contained therein should be in soluble form, such solubility in the case of sulfid ores being readily brought about by roasting. The copper is removed from the ore by lixiviation or leaching with an acid solution of copper sulfate and the resulting solution is subsequently saturated with sulfur dioxid to effect a precipitation of the copper, preferably under the influence of heat and of pressure. Free sulfuric acid is also formed as the copper is precipitated, which acid is then used to dissolve additional copper and the process is then repeated indefinitely. In carrying out this process, however, I have found that, particularly when ores are used containing practically no soluble constituent other than copper, an excess of free acid over that required for the further carrying on of the process is produced. It is advantageous to neutralize this excess of acid, or any portion of it, for in this way the amount of copper precipitated may be regulated. The neutralizing re-agent may conveniently be hydrated lime, the effect of the addition of lime to the solution being to neutralize the free sulfuric acid as it is formed and thus to increase the amount of copper precipitated. This increase will be proportionate to the amount of lime added, but I prefer not to use a sufficient amount of lime to neutralize all of the acid for the reason above stated, namely, that I desire to employ some of it in a subsequent leaching operation. It may be noted that while ordinarily copper is precipitated from sulfate solutions by hydrated lime as hydrated compounds of copper, yet when lime is employed in the manner herein stated, the result is the production of copper in metallic form and of calcium sulfate. In order to maintain the solution of a standard strength and obtain uniform precipitation of copper, when leaching an ore of this character, *i. e.*, one containing practically no soluble constituent other than copper, it will be necessary to add lime either as CaO or Ca(OH)$_2$ in an amount equivalent to the copper precipitated. That is, since two molecules of free acid are formed for every molecule of copper precipitated, it will be necessary to add sufficient CaO to neutralize one of the molecules of acid so formed and as the molecular weights of Cu and CaO are 63 and 56, the quantities by weight would be as the proportion of 63:56. The molecular weight of Ca(OH)$_2$ being 74 if the lime is added in this condition the proportion will be varied to that extent as will be well understood. If for any reason it becomes desirable to precipitate more copper, more lime may be added,—in such case however, the amount of acid formed will not be sufficient to dissolve the amount of copper precipitated and additional acid from other sources will have to be employed. The addition of such an excess of lime is not therefore desirable, except in special cases.

From the foregoing, however, it will be seen that the proportionate quantities of the materials employed may be varied within wide limits, the proportionate amount of lime employed varying in accordance with the yield of copper required or the amount of acid which it is desired to produce and leave in an unneutralized condition.

In carrying out the process, I preferably heat the copper solution, impregnated with sulfur dioxid, and containing the added lime, to varying degrees, preferably also in a closed vessel under pressure,—heat and pressure materially assisting the precipitation. After a time metallic copper or copper compounds or both are precipitated, and the free sulfuric acid formed, but as quickly as the sulfuric acid is formed it will be neutralized by the lime, up to the desired limit, such lime combining therewith to form calcium sulfate as above set forth. After the amount of lime added has all been combined with the sulfuric acid the re-action will continue with the precipitation of copper and the production of free sulfuric acid only. The copper precipitate will be finally separated from the liquor by drawing off the latter, and may be further treated as desired. The liquor so drawn off, containing as it does the sulfuric acid, will then be employed for dissolving copper from ore or in producing the sulfate solution to be employed in a new cycle of operation, whereby the process may be continued indefinitely.

What I claim is:

1. The herein described process of precipitating copper from a solution of a copper salt which consists in precipitating copper from the solution by adding sulfur dioxid thereto, and in neutralizing free acid formed by the re-action, during the time of the precipitation.

2. The herein described process of precipitating copper from a solution of copper sulfate which consists in precipitating copper from the solution by adding sulfur dioxid thereto, and in neutralizing free acid formed by the re-action, during the time of the precipitation.

3. The herein described process of precipitating copper from a solution of a copper salt which consists in impregnating the solution with sulfur dioxid to precipitate the copper, and adding a neutralizing re-agent thereto to neutralize the free sulfuric acid formed by the re-action, during the time of the precipitation.

4. The herein described process of precipitating copper from a solution of copper sulfate which consists in impregnating the solution with sulfur dioxid to precipitate the copper, and adding a neutralizing re-agent thereto to neutralize the free sulfuric acid formed by the re-action, during the time of the precipitation.

5. The herein described process of precipitating copper from a solution of a copper salt which consists in impregnating the solution with sulfur dioxid to precipitate the copper, and adding lime thereto to neutralize the free sulfuric acid formed by the re-action, during the time of the precipitation.

6. The herein described process of precipitating copper from a solution of copper sulfate which consists in impregnating the solution with sulfur dioxid to precipitate the copper, and adding lime thereto to neutralize the free sulfuric acid formed by the re-action, during the time of the precipitation.

7. The herein described process of precipitating copper from a solution of a copper salt which consists in precipitating copper from the solution by adding sulfur dioxid thereto, and in neutralizing a portion only of the free acid formed by the re-action, during the time of the precipitation.

8. The herein described process of precipitating copper from a solution of a copper salt which consists in precipitating copper from the solution by adding sulfur dioxid thereto, and in neutralizing substantially one-half of the free acid formed by the re-action.

9. The herein described process of precipitating copper from a solution of a copper salt which consists in precipitating copper from the solution by adding sulfur dioxid thereto, and in adding a sufficient quantity of a neutralizing re-agent to the solution to neutralize that portion of the free acid formed in the reaction, in excess of that required for repeating the process.

10. The herein described process of precipitating copper from a solution of a copper salt which consists in first leaching the ore with a re-agent suitable to form a neutral cupric sulfate solution, then charging the solution with sulfur dioxid to effect a precipitation of the copper, and in neutralizing a portion of the free sulfuric acid formed by the reaction, during the time of the precipitation.

11. The herein described process of precipitating copper from a solution of a copper salt which consists in first leaching the ore with a re-agent suitable to form a neutral cupric sulfate solution, then charging the solution with sulfur dioxid and heating the solution to effect a precipitation of the copper, and in neutralizing a portion of the free sulfuric acid formed by the re-action, during the time of the precipitation.

12. The herein described process of precipitating copper from a solution of a copper salt which consists in first leaching the ore with a re-agent suitable to form a neutral cupric sulfate solution, then charging the solution with sulfur dioxid and heating the charged solution under pressure to effect a precipitation of the copper, and in neutralizing a portion of the free sulfuric acid formed by the re-action, during the time of the precipitation.

GEORGE D. VAN ARSDALE.

Witnesses:
D. HOWARD HAYWOOD,
LYMAN S. ANDREWS, Jr.

Copies of this patent may be obtained for five cents each, by addressing the "Commissioner of Patents, Washington, D. C."